United States Patent [19]

Thoreson

[11] Patent Number: 5,787,705
[45] Date of Patent: Aug. 4, 1998

[54] CATALYST DIAGNOSTIC

[75] Inventor: Thomas Roger Thoreson, Brighton, Mich.

[73] Assignee: General Motors Corporation, Detroit, Mich.

[21] Appl. No.: 697,844

[22] Filed: Aug. 30, 1996

[51] Int. Cl.$^6$ ............................................. F01N 3/20
[52] U.S. Cl. ........................... 60/274; 60/276; 60/277; 60/284; 73/118.1
[58] Field of Search ..................... 60/274, 276, 277, 60/284, 285, 300; 73/118.1

[56] References Cited

U.S. PATENT DOCUMENTS

| | | | |
|---|---|---|---|
| 4,817,385 | 4/1989 | Kumagai | 60/288 |
| 5,097,700 | 3/1992 | Nakane | 73/118.1 |
| 5,177,464 | 1/1993 | Hamburg | 340/439 |
| 5,179,833 | 1/1993 | Kuroda et al. | 60/276 |
| 5,261,230 | 11/1993 | Yuuki et al. | 60/276 |
| 5,265,417 | 11/1993 | Visser et al. | 60/274 |
| 5,351,484 | 10/1994 | Wade | 60/274 |
| 5,419,122 | 5/1995 | Tabe et al. | 60/274 |
| 5,431,011 | 7/1995 | Casarella et al. | 60/274 |
| 5,444,976 | 8/1995 | Gonze et al. | 60/274 |
| 5,569,441 | 10/1996 | Engler et al. | 60/300 |
| 5,634,331 | 6/1997 | Aoki et al. | 60/284 |
| 5,675,967 | 10/1997 | Ries-Mueller | 60/274 |
| 5,713,198 | 2/1998 | Aoki et al. | 60/277 |

*Primary Examiner*—Willis R. Wolfe
*Attorney, Agent, or Firm*—Michael J. Bridges

[57] ABSTRACT

A procedure has been proposed for diagnosing operability of a catalytic treatment device for catalytically treating internal combustion engine exhaust gas, by determining whether the catalytic treatment device reaches a light-off operating condition within a short period of time following an engine coldstart operation. When catalytic converter temperature reaches a temperature level associated, for an operable catalytic converter, with light-off, the operating efficiency of the converter is sampled and, if persistently below an acceptable operating efficiency over a number of coldstart operations, a deterioration in the converter is stored and indicated.

9 Claims, 2 Drawing Sheets

CATALYST DIAGNOSTIC

FIELD OF THE INVENTION

This invention relates to automotive diagnostics and, more particularly, to catalytic treatment device diagnostics.

BACKGROUND OF THE INVENTION

Catalytic treatment devices, commonly called catalytic converters, are centrally important in automotive internal combustion engine emissions control. When catalytically active, catalytic converters significantly reduce engine emissions passing therethrough, such that emissions levels after treatment by an active catalytic converter may be substantially immeasurable. However, when a converter is substantially catalytically inactive, the emissions levels out of the converter may be substantial. The temperature of the catalyst of a catalytic converter must be elevated significantly following an engine coldstart before the converter becomes substantially catalytically active. A catalyst may be defined as being at a "light-off" condition when it is sufficiently catalytically active to oxidize fifty percent of a reasonable volume of engine hydrocarbons passing therethrough. A significant effort is made to rapidly elevate catalyst temperature to a temperature supporting light-off following an engine cold start. Proper catalytic converter functioning is required for emissions minimization. Accordingly, any deterioration in the operability of a catalytic converter must be diagnosed and rapidly treated to minimize emissions. Catalytic converter diagnosis must be reliable to avoid unnecessary inconvenience and expense. Catalytic converter diagnostics have been proposed that analyze engine emissions levels following treatment by a catalytic converter as an indication of catalytic converter operability. Such diagnostics do not operate until well after light-off conditions are reached to assure the converter will be active and the operability thereof measurable. However, once the converter is active, very little emissions are available for measurement and analysis, and only "catastrophic" catalytic converter failures resulting in large increases in engine emissions may be diagnosable. The emissions increases associated with less than catastrophic failures may go undetected under such proposed diagnostics. It would therefore be desirable to diagnose catalytic converter deterioration conditions whether large or small in effect to facilitate timely repair of the condition and to minimize emissions penalties.

It has been established that the catalytic converter temperature that must be maintained to support converter light-off increases significantly as the operability of a converter deteriorates, for example due to thermal aging and catalyst contamination (poisoning). The light-off temperature increase leads to an increase in time to light-off for a given heat energy source to the converter, such as from engine exhaust gas heat energy transfer or from a supplemental heater. The increase in time to light-off results in more time without an active converter and higher overall engine emissions. However, once light-off is achieved, there may be little measurable difference in converter performance between a deteriorated and a "healthy" converter, such that the described proposed diagnostics that only operate well after light-off occurs may not diagnose the deterioration condition in a timely manner. It would further be desirable to diagnose catalytic converter deterioration conditions resulting in an increased time to light-off to minimize the emissions penalty corresponding thereto.

SUMMARY OF THE INVENTION

The present invention is a catalytic converter diagnostic responsive to a variation in time to reach a light-off condition. A light-off time is established for a converter of acceptable operability. Catalytic converter performance is monitored at such light-off time. The monitored performance is then compared to an minimum acceptable performance level characteristic of a converter just reaching the light-off condition. If the converter is not substantially catalytically active, its performance will be less than the minimum acceptable performance level, and a deterioration condition is indicated.

More specifically, periodically, such as at each engine startup operation, engine operating conditions are monitored and logged. A temperature value representative of the catalytic converter temperature is also monitored. The temperature value may be estimated based on the logged operating conditions or may be directly measured. When the temperature value reaches a predetermined threshold temperature, a converter light-off operating condition is assumed to occur. The threshold temperature is set as the highest light-off temperature for an "operable" catalytic converter of the type used in the instant application. Engine emissions after any treatment thereof by the converter are sampled at the time light-off is assumed to occur. Concentration of a single engine emissions component, such as hydrocarbons HC, carbon monoxide CO, or oxides of nitrogen NOx may be determined from direct exhaust gas sampling. An expected emissions concentration is also determined, which corresponds to the highest acceptable concentration of the engine emissions element for a converter just reaching the light-off condition. If the actual emissions element concentration exceeds the expected emissions concentration, a converter light-off failure is diagnosed, wherein the converter failed to reach light-off within an acceptable time. If such failure persists, a converter deterioration condition is assumed to be present, and is indicated to facilitate off-line repair or replacement operations.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
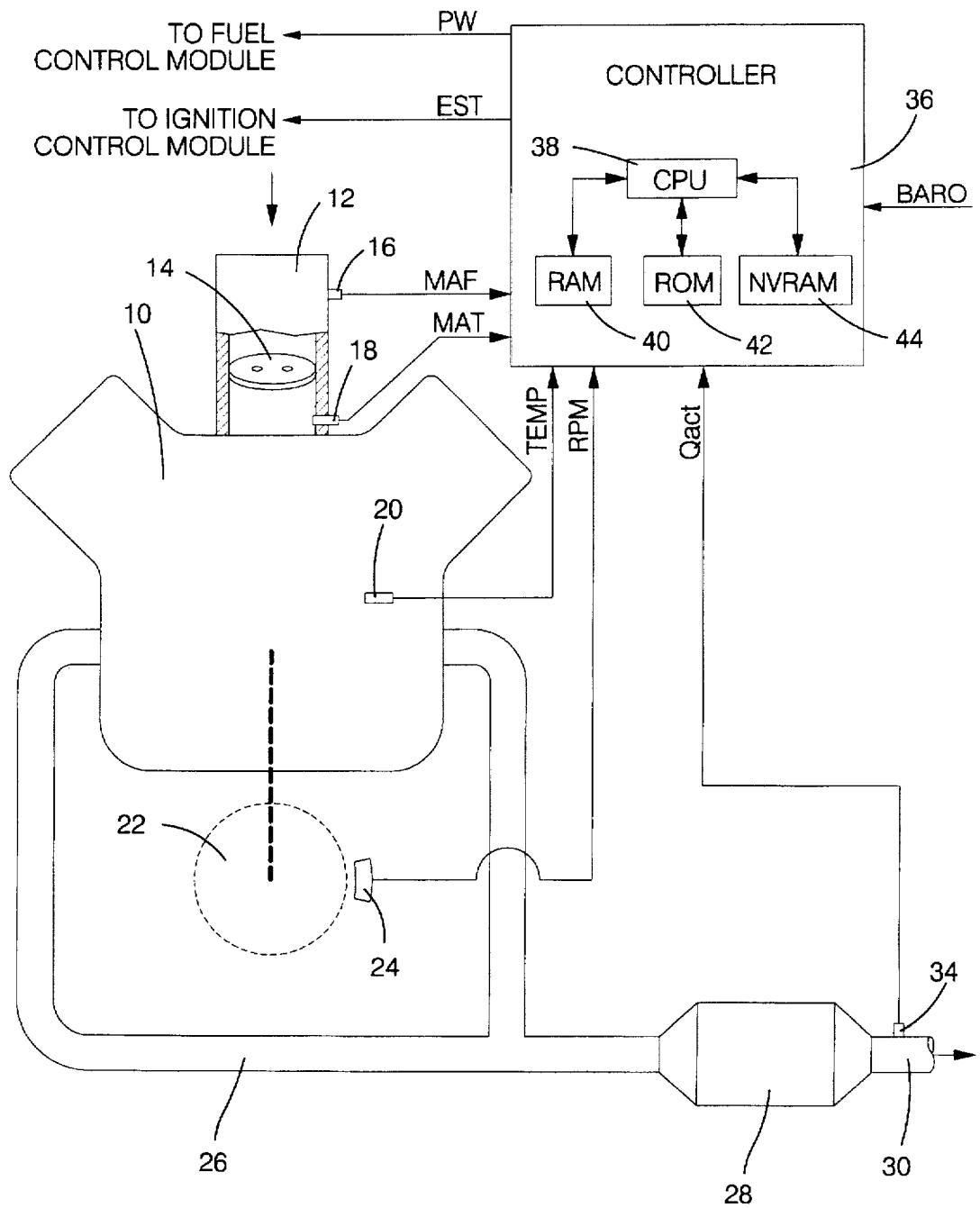
FIG. 1 is a general diagram of the engine and engine diagnostic hardware of the preferred embodiment of this invention.

Referring to FIG. 1, internal combustion engine 10 receives intake air through intake bore 12 in which conventional thick film or hot wire type mass airflow sensor 16 is disposed for transducing mass flow rate of intake air into signal MAF. Engine intake airflow may alternatively be determined through the generally understood speed-density approach. The intake air is metered through the bore 12 by manually or electronically controlled intake air valve of the butterfly or rotary type. Air temperature downstream of the intake air valve 14 (in an intake plenum or manifold) is transduced by thermocouple or thermistor 18 into output signal MAT. The intake plenum functions to distribute the intake air to a plurality of intake runners (not shown) into which fuel is selectively injected forming an air-fuel mixture. Alternatively, fuel may be injected directly into engine cylinders. Each intake runner terminates at a valved engine cylinder intake port for timed admittance to an engine cylinder for combustion therein. The combustion products are guided out of the cylinders through an exhaust port which opens into an exhaust conduit 26. The exhaust conduit 26 terminates at an opening of a generally-available catalytic treatment device 28 for guiding the exhaust gas to the device 28 for treatment thereby, the treated engine exhaust gas passing out of the device 28 and through tailpipe 30 in which is disposed an exhaust gas sensor, such as a commercially-available calorimetric sensor 34 or hydrocarbon sensor for transducing concentration of combustibles (such as hydrocarbons HC) into sensor output signal Qact.

A conventional piston is received within each cylinder of the engine 10 and is reciprocally driven within the cylinder by the cylinder air-fuel mixture combustion reaction. Each piston is mechanically linked to an engine output shaft 22 whereby the reciprocal piston actuation rotationally drives the output shaft. Sensor 24 of the Hall effect or variable reluctance type is positioned in proximity to the output shaft 22 to transduce output shaft rotation into output signal RPM having a frequency proportional to the rate of rotation of the output shaft 22 and having individual signal events indicating occurrence of engine events. Ambient barometric pressure is transduced external to the engine by conventional pressure transducer (not shown) into output signal BARO.

Engine coolant is circulated through a conventional coolant circulation path (not shown) in which is disposed a conventional temperature transducer 20 in the form of a thermocouple or thermistor for transducing the coolant temperature into output signal TEMP. The transducer output signals are received by conventional microcontroller 36 of a form generally understood in the art and including such well-known elements are a central processing unit CPU 38 having arithmetic logic circuitry for carrying out logic and arithmetic logic operations and control circuitry, and various memory devices including random access memory RAM 40, read only memory ROM 42, and non-volatile random access memory NVRAM 44.

The controller is activated upon manual application of ignition power thereto by an engine operator and, when activated, carries out a series of operations stored in an instruction-by-instruction format in ROM 42 for providing engine control, diagnostic and maintenance operations. Included in such operations are fuel control and ignition control operations for generating and issuing an engine fueling command in the form of a fuel injector pulse width PW to a fuel control module (not shown) for driving at least one engine fuel injector to deliver fuel to the described cylinder intake runners for mixing with intake air, and for generating and issuing an ignition timing command EST to an ignition control module (not shown) for timed energization of spark plugs in active engine cylinders for igniting the air-fuel mixture. Any commercially-available fueling and ignition timing control operations may be used for generating and issuing the signals PW and EST.

Figure 2:
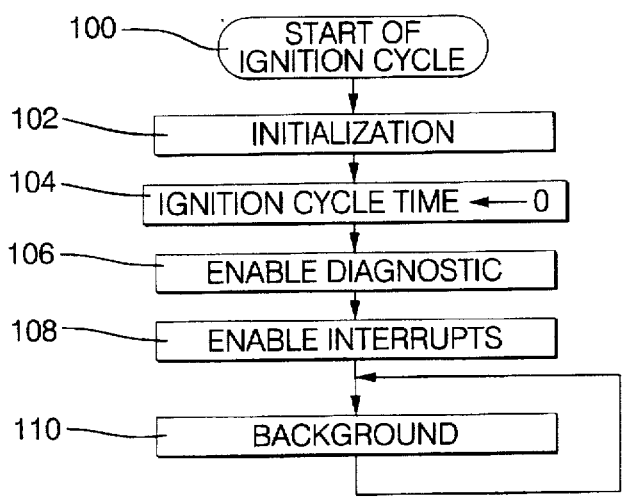
FIGS. 2–3 are computer flow diagrams illustrating a flow of operations of the hardware of FIG. 1 for carrying out this invention.
Figure 3:
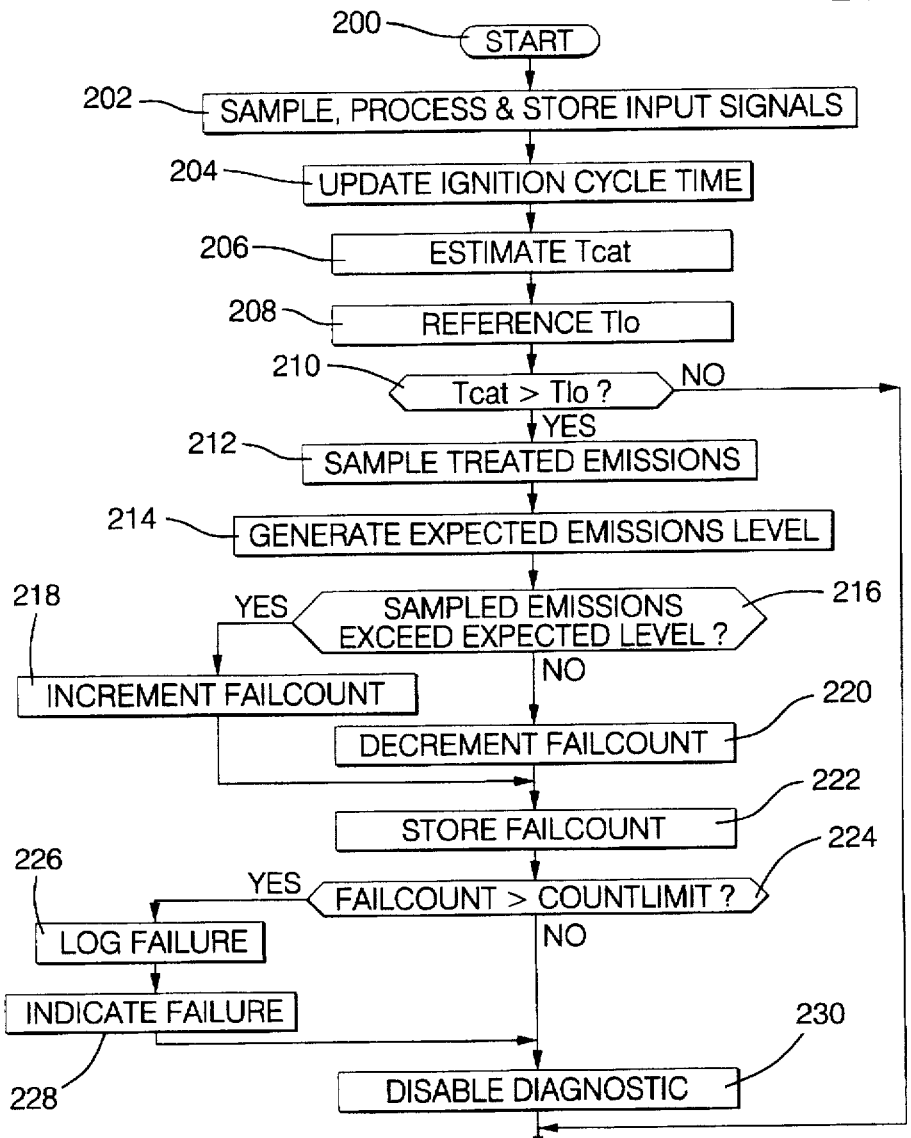

Beyond the plurality of conventional diagnostic procedures that may be included in accord with this embodiment is the procedure for diagnosing deterioration of the catalytic treatment device 28 of FIG. 1 as outlined in FIGS. 2 and 3. Generally, this procedure provides for monitoring of the operability of the catalytic treatment device 28 (also referred to herein as the catalytic converter) at a time the converter should normally be reaching light-off and prior to a time at which the converter should be operating at its maximum efficiency, to ascertain whether the beneficial emissions reduction characteristic of light-off is reached in a timely manner so as to diagnose and therefore avoid an extended period of converter inactivity or low efficiency. If such activity is consistently not being reached in a timely manner, a converter deterioration condition is logged and indicated to facilitate repair operations by the vehicle operator or a service technician.

More specifically, such operations are initiated at step 100 of FIG. 2 upon application of ignition power to a previously inactive controller 36 by the engine operator, such as by rotating an ignition cylinder to an "on" position, and proceed from step 100 to carry out general initialization operations at a next step 102. Such initialization operations include operations for setting pointers, counters and flags to initial values, clearing of blocks of RAM 40 (FIG. 1), and transferring data from ROM locations to RAM locations.

Following general initialization operations, an ignition cycle time marking the start time of the current ignition cycle is cleared at a next step 104, and a catalytic converter diagnostic is enabled at a next step 106, such as by setting a diagnostic enable flag in RAM 40 (FIG. 1). Interrupts, including timer-based and event-based interrupts are next enabled at a step 108 to occur following pre-established timer events, such as following pre-selected time sequences or upon occurrence of predetermined engine events such as engine cylinder top dead center events.

After enabling interrupts at the step 108, background operations, including conventional maintenance and diagnostic operations of a relatively low priority are continuously executed at a step 110. The background operations may be temporarily suspended to provide for servicing of timer and event-based interrupts, as described. Such background operations may be continuously executed or may be executed following certain time delays. For example, about every one hundred milliseconds while such background operations are being executed, the operations of the routine of FIG. 3 are executed, beginning at a step 200.

Such operations provide for diagnosis of catalytic converter deterioration conditions and are executed when such diagnostic is active, for example as indicated by the flag set at the described step 106 and after about one hundred milliseconds elapse while carrying out the described background operations of step 110 of FIG. 2. The routine proceeds from the step 200 to reference from memory or sample from input signals, and process and store current values of controller input signals including signals RPM, TEMP, BARO, MAF, and MAT at a next step 202. Such sampled signals are, if necessary, processed at the step 202 into representative values indicating engine speed, ambient barometric pressure, engine intake mass airflow, engine load, engine coolant temperature, and engine intake plenum air temperature for use in the current diagnostic operations or any other control or diagnostic operations. Such values are stored in RAM 40 (FIG. 1).

After sampling, processing and storing input signal information, an ignition cycle time is updated at a next step 204 so as to maintain a current value of the time elapsed since the beginning of the current ignition cycle. The updated ignition cycle time is stored in RAM 40. A temperature of the front of the catalytic treatment device 28 of FIG. 1 is next estimated or measured at a step 206. For example, a stored calibrated model of catalytic converter temperature Tcat may be generated as a function of such engine parameters as MAT, TEMP, ignition cycle time, and fuel flow to the fuel injectors which may be determined from controller output signal PW. The model is stored in ROM 42 (FIG. 1), and a current Tcat referenced therefrom as a function of current fuel flow, MAT, TEMP, and ignition cycle time. The model may be generated off-line through a conventional calibration process by, for example, repeatedly measuring and recording Tcat under a range of MAT, TEMP, fuel flow and ignition cycle time values and storing representative results in ROM 42 in the form of a conventional lookup table. Alternatively, a thermocouple or thermistor may be installed in the front of the catalytic converter for direct measurement of Tcat.

After estimating Tcat, a light-off catalyst temperature Tlo is referenced from ROM 42 at a next step 208. Tlo may be determined as the highest temperature at which a catalytic converter with tolerable efficiency will oxidize approximately fifty percent of the hydrocarbons passing therethrough and may be determined experimentally or provided by a catalytic converter manufacturer for a specific catalytic converter model. Converter light-off temperature has been established to increase as a catalytic converter deteriorates, as described. At some level, the converter deterioration becomes unacceptable, and repair or replacement is required to maintain acceptable automotive emissions. Tlo should be determined as the light-off temperature for a converter having the highest deterioration level that is still acceptable.

Tcat is next compared to Tlo at a step 210. If Tcat is not yet elevated to Tlo, the converter is assumed to not yet have reached light-off, and the remaining steps of FIG. 3 are bypassed by returning, via a step 232, to any further operations that may be required to service the timer interrupt that initiated FIG. 3 or, if no such operations are required, to return to any operations that were temporarily suspended to provide for execution of the timer interrupt service operations, such as the described background operations of FIG. 2.

Returning to step 210, if Tcat exceeds Tlo, the converter is assumed to just have reached light-off, and the actual emissions concentration signal Qact output by sensor 34 of FIG. 1 is sampled and processed at a step 212 into a value representing the concentration of a predetermined emissions element. In this embodiment, the predetermined emissions element is hydrocarbons HC. However, the inventor intends that any accurately measurable emissions element, such as oxygen, carbon monoxide, oxides of nitrogen or combustibles, having a concentration indicating the operability of the catalytic converter 28 may be sampled at the step 212 via a conventional sensor in the position downstream of the catalytic converter 28, as illustrated by the position of sensor 34 of FIG. 1.

Following the emissions sampling at the step 212, an expected HC emissions level is next generated at a step 214 as a maximum tolerable HC concentration following catalytic treatment thereof by an acceptably functioning catalytic converter 28 (FIG. 1) that has just reached light-off operating temperature. For a given catalytic converter, such as the converter 28 of FIG. 1, when light-off temperature is determined to just have been reached, at least fifty percent of HC should be oxidized by the converter. By estimating the HC concentration entering the converter 28 as a function of ambient conditions and the engine operating condition, an estimate of the maximum HC concentration out of the converter (the expected concentration of step 214) may be directly calculated. If the actual HC concentration is persistently greater than the estimated concentration, the converter 28 is assumed to not be at a light-off condition, and a converter deterioration condition resulting in increased light-off temperature and therefore increased light-off time is diagnosed and indicated. The expected HC concentration may be, following the conventional calibration procedure, be stored in the form of a conventional lookup table in ROM 42 (FIG. 1) and HC concentration values referenced therefrom as a function of BARO, TEMP, RPM, engine load (from MAF), ignition cycle time, etc. at the step 214.

It should be noted that HC is but one emissions element that may be used to indicate converter operability within the scope of this invention. Additionally, the concentration of such well-known emissions elements as HC, CO, O2, NOx, and $CO_2$ may be sampled through corresponding sensors in the position of sensor 34 of FIG. 1 at the step 212, and expected concentrations of such emissions elements may be determined as described for the step 214.

Following the step 214, the sampled emissions level (of HC in this embodiment) is compared at a step 216 to the expected level as generated via the step 214. If the sampled level exceeds the expected level, the converter 28 is assumed to not have reached light-off operating temperature, and a light-off failure count FAILCNT is incremented at a next step 218 to log the failure. If the sampled level does not exceed the expected level at the step 216, the converter is assumed to be at light-off operating temperature, and FAILCNT is decremented at a next step 220. Next, of following step 218, FAILCNT is stored in non-volatile memory NVRAM 44 (FIG. 1) at a step 222 to preserve its value between vehicle ignition cycles so that a running count of the status of the converter 28 is maintained.

FAILCNT is next compared to a count limit value COUNTLIMIT at a step 224, wherein COUNTLIMIT may be established as the number of light-off failure conditions that may be tolerated for a given application before the converter is diagnosed as sufficiently deteriorated that repair or replacement operations are required. COUNTLIMIT should be set high enough to avoid false indications of converter deterioration and the potential unnecessary cost and inconvenience that may be associated therewith, yet should not be so high that a failure condition is not promptly indicated to facilitate treatment thereof.

If FAILCNT exceeds COUNTLIMIT at the step 224, a failure condition is logged in NVRAM at a next step 226 to aid a service technician in distinguishing and remedying the fault condition, and a failure is indicated at a next step 228, such as by illuminating a lamp (not shown) that may be positioned so as to be visible to the engine operator, or by energizing a chime to indicate to the engine operator that service operations are required. Next, or if FAILCNT does not exceed COUNTLIMIT at the step 224, the current catalytic converter diagnostic operations are disabled at a step 230, such as by clearing a flag in RAM 40 (FIG. 1), as the converter diagnostic for the current ignition cycle is now complete. After disabling the diagnostic, or if the converter is assumed to not be at light-off at the step 210, the described step 232 is executed to return to resume prior controller operations.

In alternative embodiments within the scope of this invention, a conventional emissions sampling system may be provided with a remotely mounted sensor 34, wherein a portion of engine exhaust gas is guided through a sampling conduit tapped off the tailpipe 30 of FIG. 1, with the sensor 34 disposed in the sampling conduit, to reduce the extreme operating environment of the sensor 34. The timing of sampling of the sensor would remain as described in the preferred embodiment hereof. Additionally, the sampling system could take a sample at the time light-off is assumed to occur, and store the sample in a storage area until the sensor 34, which may require a period of heating before becoming active, is active. The sensor 34 may be positioned so as to be exposed to the stored sample. Once the sensor 34 is active, it may be sampled to indicate the concentration of a certain emissions element, such as HC, in the stored sample, at the time light-off was assumed to have occurred. This alternative reduces rapid activation requirements of the sensor 34.

Still further, a commercially available absorber may be provided within the sampling system in proximity to the sensor 34 (FIG. 1) to absorb the sampled emissions element (such as HC) for a test period at the time converter 28 light-off is assumed to have occurred. The sensor 34 may be exposed to the absorber to sample the emissions concentration thereof to indicate whether light-off has actually occurred with relieved sensor sensitivity requirements.

The preferred embodiment for the purpose of explaining this invention is not to be taken as limiting or restricting the invention since many modifications may be made through the exercise of ordinary skill in the art without departing from the scope of the invention.

The embodiments of the invention in which a property or privilege is claimed are described as follows:

1. A diagnostic method for diagnosing a deterioration condition in an automotive internal combustion engine catalytic treatment device for catalytically treating internal combustion engine exhaust gas, comprising the steps of:

guiding internal combustion engine exhaust gas to the catalytic treatment device for treatment by the catalytic treatment device;

estimating occurrence of a catalytic treatment device light-off condition in which an operable catalytic treatment device will reach a predetermined operating efficiency;

estimating actual operating efficiency of the catalytic treatment device when the light-off condition is estimated to have occurred;

comparing the actual operating efficiency to an expected operating efficiency; and diagnosing a deterioration condition when the actual operating efficiency is less than the expected operating efficiency.

2. The method of claim 1, wherein the step of estimating occurrence of the light-off condition further comprises the steps of:

estimating catalytic treatment device temperature;

comparing the estimated temperature to a threshold temperature; and estimating the occurrence when the estimated temperature first exceeds the threshold temperature.

3. The method of claim 2, wherein the step of estimating temperature further comprises the steps of:

estimating an engine operating condition;

logging engine operating time following an engine startup operation; and generating a catalytic treatment device temperature estimate as a predetermined function of the estimated engine operating condition and of the logged engine operating time.

4. The method of claim 1, wherein the step of estimating actual operating efficiency further comprises the step of sensing a concentration of a predetermined engine exhaust gas component following treatment of the engine exhaust gas by the catalytic treatment device as an indication of the actual operating efficiency.

5. The method of claim 1, further comprising the steps of:

incrementing a stored fault counter when the actual operating efficiency is less than the expected operating efficiency; and comparing the stored fault counter to a predetermined count threshold; and wherein the diagnosing step diagnoses a deterioration condition when the stored fault counter exceeds the predetermined count threshold.

6. In an automotive emissions control system including a catalytic converter for catalytically treating internal combustion engine exhaust gas passing therethrough, a method for diagnosing deterioration in the operability of the catalytic treatment device, comprising the steps of:

generating a catalyst temperature value representative of the temperature of the catalytic converter;

estimating a catalytic converter light-off time as a function of the catalyst temperature value;

measuring catalytic converter operating efficiency at the light-off time;

comparing the operating efficiency to a threshold efficiency level; and diagnosing deterioration in the operability of the catalytic converter when the operating efficiency does not exceed the threshold efficiency.

7. The method of claim 6, wherein the diagnosing step diagnoses an increase in light-off time beyond a light-off time corresponding to an operable catalytic converter when the operating efficiency does not exceed the threshold efficiency.

8. The method of claim 6, wherein the measuring step further comprises the steps of:

providing a transducer in the emissions control system in position to transduce concentration of an exhaust gas component into a concentration signal, following passage thereof through the catalytic converter;

sampling the concentration signal at the light-off time; and generating a component concentration value as a function of the sampled concentration signal;

wherein the component concentration value indicates catalytic converter operating efficiency.

9. The method of claim 6, further comprising the steps of:

providing a threshold temperature at which an operable catalytic converter reaches a predetermined conversion efficiency; and comparing the catalyst temperature value to the threshold temperature;

and wherein the estimating step estimates catalytic converter light-off time as the time when the catalyst temperature value exceeds the threshold temperature.

* * * * *